H. GOLDSCHMIDT & F. LANGE.
TRANSPORTABLE CLAMPING APPARATUS FOR WELDING PURPOSES.
APPLICATION FILED SEPT. 18, 1907.
964,640.
Patented July 19, 1910.
2 SHEETS—SHEET 1.
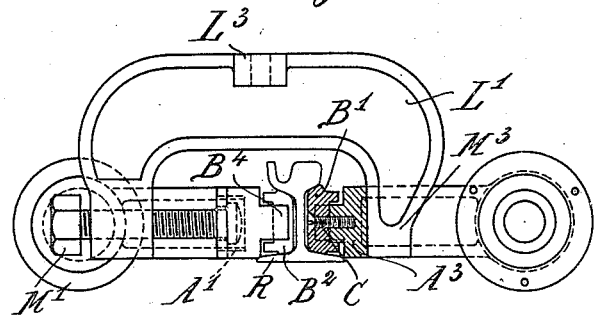
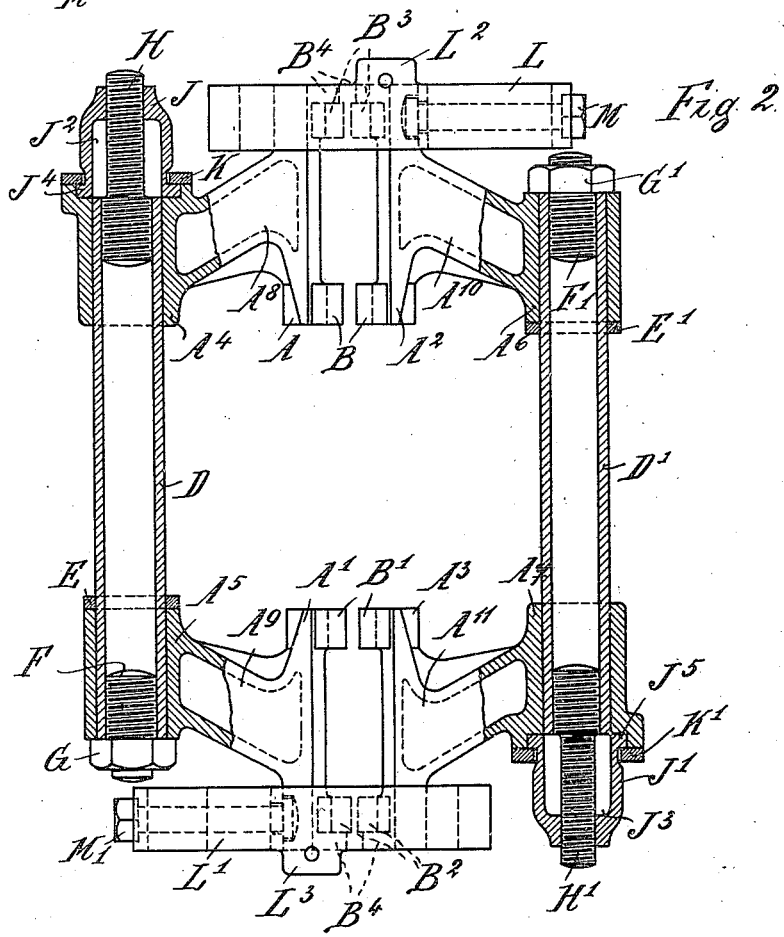
Witnesses:
Paul Wollenberg
Arthur Scholz
Inventors
Hans Goldschmidt and
Felix Lange.
by Rosenträger
Attorney.

H. GOLDSCHMIDT & F. LANGE.
TRANSPORTABLE CLAMPING APPARATUS FOR WELDING PURPOSES.
APPLICATION FILED SEPT. 18, 1907.
964,640.
Patented July 19, 1910.
2 SHEETS—SHEET 2.
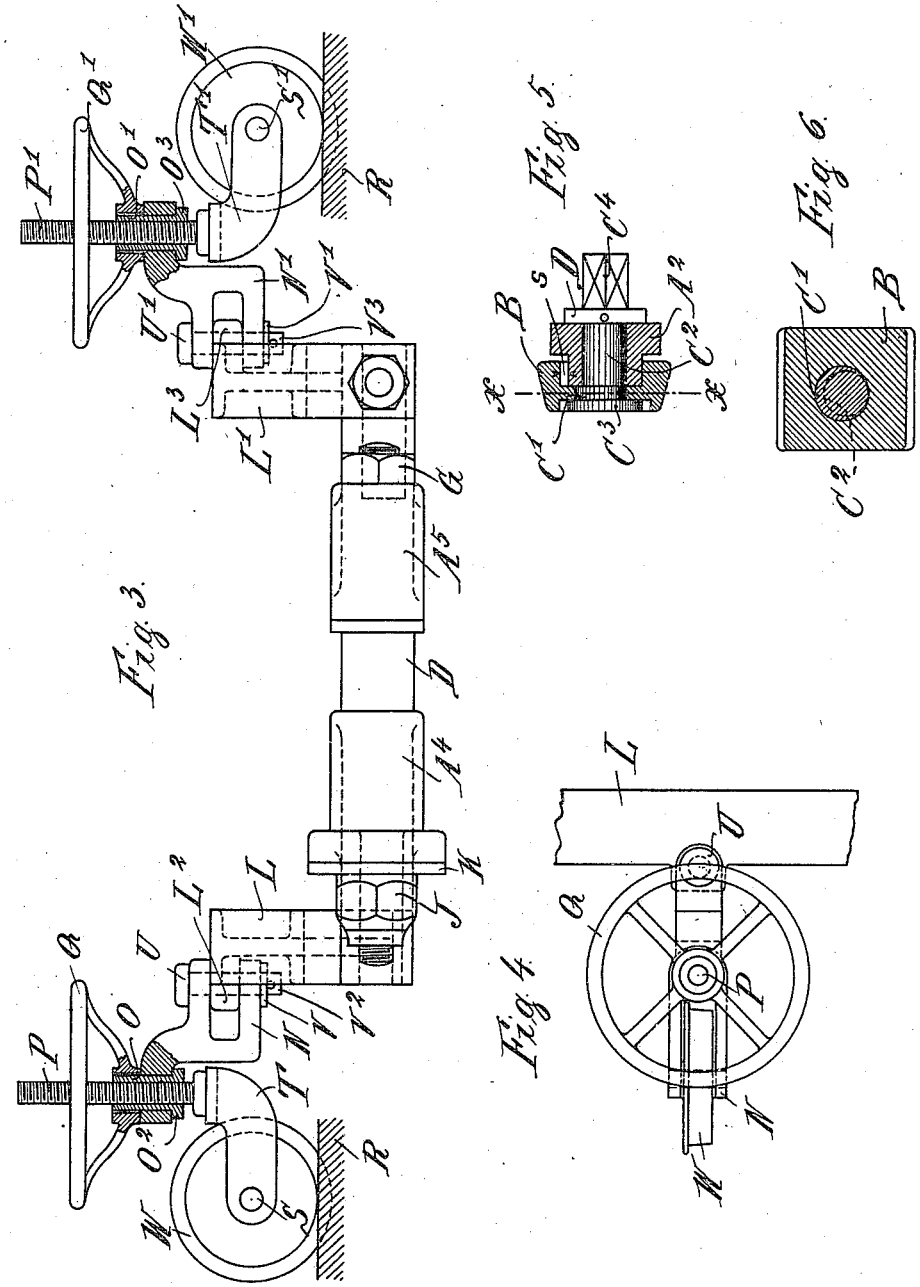
Witnesses:
Paul Wollenberg
Arthur Scherz
Inventors
Hans Goldschmidt and
Felix Lange.
by Robert Reiffer
Attorney.

UNITED STATES PATENT OFFICE.

HANS GOLDSCHMIDT AND FELIX LANGE, OF ESSEN-ON-THE-RUHR, GERMANY, ASSIGNORS TO GOLDSCHMIDT THERMIT COMPANY OF NEW YORK.

TRANSPORTABLE CLAMPING APPARATUS FOR WELDING PURPOSES.

964,640.　　　　　　　Specification of Letters Patent.　　Patented July 19, 1910.

Application filed September 18, 1907. Serial No. 393,563.

*To all whom it may concern:*

Be it known that we, HANS GOLDSCHMIDT and FELIX LANGE, both subjects of the King of Prussia, German Emperor, and residents of Essen-on-the-Ruhr, German Empire, have jointly invented an Improved and Transportable Clamping Apparatus for Welding Purposes, of which the following is an exact specification.

This invention relates to the clamps used for welding rail and like lengths electrically or by the thermic process. Such welding is frequently caried out *in situ* and the present invention relates particularly to a clamp for use in welding by any of these processes *in situ*. In order to get efficient action in such clamps we have discovered that it is necessary to effect the gripping by a lateral motion of the jaws at right angles to the axis of the bar or length to be joined and that the jaws gripping each length should be simultaneously brought toward each other by forces applied at each side of the axis of the bar. By this means a very accurate alinement of the parts to be welded is obtained. It will be recognized from the above that the ordinary tong-grip will not be sufficient and therefore we employ in our improved clamp pairs of clamping jaws in which the separate members of each pair are pivoted on opposite sides of the bar or length and also the members of the pairs of clamping jaws lying on the same side of the rail are pivoted to the same axis. These axes of course are arranged one on each side of the rail or the like to be welded. The clamps *i. e.* the pairs of clamping jaws are suitably supported from trucks or trolleys adapted to run on the rails or the like and means is provided for lowering or raising the clamping jaws.

The invention will be more readily understood from the accompanying drawings and the novel combination of parts is set forth in the claims.

The improved clamp is illustrated in the accompanying drawings, in which—

Figure 1 is an elevation of the clamping device with one of the right hand jaws shown in section, Fig. 2 is a plan of the clamping device shown in Fig. 1, Fig. 3 illustrates the clamping device and transporting arrangement therefor, Fig. 4 is a detail plan view of the transporting device, Fig. 5 illustrates a modified form of the gripping plate in vertical cross section and Fig. 6 is a section on the line $x$—$x$ of Fig. 5.

In carrying the invention into effect according to the form shown the rail or like lengths R, which are to be butt welded, are gripped between jaws A, A', $A^2$, $A^3$. The jaws A, A' arranged on one side of the rail lengths R are pivoted on a tube D which passes through bosses $A^4$ and $A^5$ connected by webs $A^8$ and $A^9$ with the said jaws A and A'. The jaws $A^2$ and $A^3$ on the opposite side of the rail lengths are pivoted about a tube D' which fits in bosses $A^6$ and $A^7$ connected to the said jaws $A^2$ and $A^3$ by means of webs $A^{10}$ $A^{11}$. The diagonally opposite bosses $A^6$ and $A^5$ are held from sliding on the tubes D, D' by means of collars E and E' and nuts, G and G' engaging screws F and F' threaded into the ends of the tubes D and D'. The other set of diagonally opposite jaws A and $A^3$ are adapted to slide with their bosses $A^4$ and $A^7$ over the tubes D and D'. This sliding motion is obtained by means of nuts J and J' engaging screws H and H' of considerable length which project from the ends of the tubes D and D'. The nuts J and J' are hollowed out to form annular chambers $J^2$ and $J^3$ into which the tubes D and D' are drawn. The nuts J and J' are also provided with shoulders $J^4$ and $J^5$ which are held by collars K and K' fixed in any suitable way to the bosses $A^4$ and $A^7$. By means of the mechanism described the pairs of jaws A, $A^2$ and A', $A^3$ after they have been caused to grip the rail R in the manner hereinafter described may be drawn toward one another in the axial direction of the rail.

The jaws A, A', $A^2$, $A^3$ carry gripping plates B, B' $B^2$ and $B^3$ which may be fixed to the jaws by screws C, see Fig. 1, and are fitted over bosses or shoulders $B^4$ formed on the face of the jaws A, A', $A^2$, $A^3$. These gripping plates B, B', $B^2$, $B^3$ are shaped so as to conform substantially to the profile of the rail and thereby insure a good gripping action. Over the jaws and on the outsides of the same there are arranged cramping yokes L and L'. The cramping yokes butt on one side with the jaw $M^3$ against one of the jaws of a pair and on the other side of the rail the cramping yokes L and L' carry threaded rods M and M', the inner end of which bears against the opposite jaw of a pair to that which is engaged by the jaw M³.
It will be seen that with this device it is possible on rotating the screwed rods M and M' to cause the pairs of jaws to grip the rail R after which the said pairs of jaws may be caused to approach each other as described above.

For facilitating transport and insuring the correct coaxial arrangement of the jaws during welding the cramping yokes L and L' are carried by the transporting device hereinafter described and illustrated in Figs. 3 and 4. For this purpose the cramping yokes L and L' are provided with lugs L² and L³. Over these lugs there pass the forked brackets N and N' which are fastened to the lugs by pins U, U', washers V, V' and split pins V², V³. The brackets N, N' are hook shaped upwardly and surround sleeves O, O' so that the said brackets N and N' act as hanger brackets. The sleeves O, O' carry shoulders O², O³ on which the said hanger brackets N, N' rest and these sleeves carry further hand wheels Q, Q' by which they may be rotated. The sleeves O, O' are internally threaded and engage an external thread on vertical rods P, P'. The vertical rods P, P' are fixed to forked brackets T, T'. These forked brackets carry the axles S, S' of the truck wheels W, W'. The truck wheels W, W' are adapted to run on the rail lengths R R.

For the purpose of effecting slight adjustments of the rails relatively to one another we prefer to employ the device shown in Figs. 5 and 6 on at least one of the faces of the jaws of a pair that is either on the jaw A or A² and on the jaw A' or A³. For the sake of clearness this form of adjustable gripping plate has been separately illustrated, as applied to the jaw A². The gripping plate B is bored out with two diameters so as to accommodate the diameters C' and C³ of a pin C². The disk C' on the pin is arranged eccentrically to the part C² as can be seen in Fig. 6. The part C² is supported in the jaw A² and a suitable collar D is employed to retain the said pin in place. A squared end C⁴ enables rotation of the said pin. It will be seen that by rotating the pin C² the gripping plate B may be raised or lowered and thereby one length of the rail may be raised or lowered as required to bring it into alinement with the opposite rail.

The device hereinbefore described when in use is employed for butt-welding two lengths. One of the lengths is gripped between the jaws A, A² by tightening up the threaded rod M and the other length is gripped between the jaws A', A³ by tightening up the threaded rod M'. The joint is then of course between the two pairs of jaws. When the ends of the lengths have been brought to a welding heat for instance, by the well known alumino-thermic process the nuts J and J' are rotated and thereby the pairs of jaws are caused to approach each other and place the ends of the rail together. During this motion the said lengths are efficiently guided by the said rods D and D' so that the two lengths are correctly and accurately welded in line. After welding is complete the jaws A, A², A', A³ require only to be slackened back and the entire device trolleyed along the rail to the next joint so that rapidity, accuracy and convenience are obtained by the device illustrated.

We claim:—

1. In a clamping apparatus for butt-welding rail and like lengths the combination of cylindrical guides adapted to be placed on opposite sides of the rail lengths and carrying threaded end pieces, clamping jaws pivoted on said cylindrical guides so that a jaw on one guide co-acts to effect clamping with a jaw on the other guide, a cramping yoke for each pair of jaws to draw said jaws together to grip the rails, collars on the guides against which some of said jaws are held from axial sliding nuts engaging some of the threaded end pieces on the guides to hold the said jaws against said collars and nuts engaging the remaining threaded end pieces on the guides to cause the gripping pairs of jaws to approach one another.

2. A transportable clamp for butt welding rail and like lengths comprising sets of clamping jaws, side guiding means for guiding said jaws axially, means for tightening said jaws to the rail lengths, means for drawing said sets of jaws toward one another, wheels adapted to run in the line of the lengths to be joined, hangers supported from said wheels and engaging the clamping apparatus and means for raising and lowering said hangers.

3. In a transportable clamping apparatus for welding purposes, the combination of a jaw body, a rotatable shaft supported in said body, a disk eccentrically fixed on said shaft on its front end, a gripping plate on said jaw body and recessed to receive the eccentric disk on the shaft, a collar on the rear of said shaft and butting against said jaw body to hold said shaft in place and a part on said shaft extending beyond said collar for the purpose of enabling said shaft to be rotated, substantially as described.

4. In combination with a transportable clamping apparatus, a carrier for said clamping apparatus comprising a wheel, a forked support, an axle carried by said support and on which said wheel revolves, an upright threaded spindle carried by said forked support a threaded sleeve engaging on said spindle, a hanger supported from said sleeve and attached to the clamping apparatus and means for rotating said sleeve on the screwed spindle for the purpose of raising and lowering said clamping apparatus, substantially as described.

In witness whereof we have hereunto set our hands in the presence of two witnesses.

HANS GOLDSCHMIDT.
FELIX LANGE.

Witnesses:
ALFRED POHLMEYER,
M. ENGELS.